(12) United States Patent
Tojo et al.

(10) Patent No.: US 7,463,290 B2
(45) Date of Patent: Dec. 9, 2008

(54) INFORMATION STORING APPARATUS AND METHOD THEREOF

(75) Inventors: Hiroshi Tojo, Tokyo (JP); Hidetomo Sohma, Kanagawa (JP); Masanori Ito, Osaka (JP)

(73) Assignees: Canon Kabushiki Kaisha, Tokyo (JP); Panasonic Corporation, Osaka (JP)

( * ) Notice: Subject to any disclaimer, the term of this patent is extended or adjusted under 35 U.S.C. 154(b) by 856 days.

(21) Appl. No.: 10/693,877

(22) Filed: Oct. 28, 2003

(65) Prior Publication Data

US 2004/0086265 A1    May 6, 2004

Related U.S. Application Data

(63) Continuation of application No. PCT/JP02/05229, filed on May 29, 2002.

(30) Foreign Application Priority Data

May 31, 2001    (JP)    ............................. 2001-165381

(51) Int. Cl.
  *H04N 5/76*    (2006.01)
  *H04N 7/00*    (2006.01)
(52) U.S. Cl. ................... 348/231.3; 348/231.2; 386/95; 386/96
(58) Field of Classification Search .............. 348/231.5; 386/69, 95, 117
  See application file for complete search history.

(56) References Cited

U.S. PATENT DOCUMENTS

| | | | | |
|---|---|---|---|---|
| 5,583,654 A | | 12/1996 | Oguro | .......................... 386/96 |
| 5,684,919 A | | 11/1997 | Kikuzawa et al. | ............. 386/95 |
| 6,009,233 A | | 12/1999 | Tsujimura et al. | ............. 386/95 |
| 6,230,162 B1 | * | 5/2001 | Kumar et al. | ............ 707/104.1 |
| 6,466,970 B1 | * | 10/2002 | Lee et al. | ..................... 709/217 |
| 6,529,522 B1 | | 3/2003 | Ito et al. | ..................... 370/466 |
| 6,574,279 B1 | * | 6/2003 | Vetro et al. | ............ 375/240.23 |
| 6,829,648 B1 | * | 12/2004 | Jones et al. | .................. 709/230 |
| 6,977,679 B2 | * | 12/2005 | Tretter et al. | ............. 348/231.2 |
| 7,072,983 B1 | * | 7/2006 | Kanai et al. | .................. 709/246 |

(Continued)

FOREIGN PATENT DOCUMENTS

EP    0 951 173    10/1999

(Continued)

*Primary Examiner*—Tuan Ho
*Assistant Examiner*—Pritham Prabhakher
(74) *Attorney, Agent, or Firm*—Fitzpatrick, Cella, Harper & Scinto

(57) ABSTRACT

In storing main information such moving image data and metadata accompanying the main information, for a metadata item for which a plurality of description forms are present, a priority table in which the priority of each description form is set for each item is held in advance. Under limitation conditions related to metadata storage due to the data collection time of metadata or the calculation time of a value corresponding to a description form, a metadata item and description form are employed in descending order of priority held in the priority table (S122) whereby metadata is formed and stored in correspondence with main information (S126). With this arrangement, it is reliably possible to use supplementary information in a form that can be used at least in wide-ranging devices and control schemes, and it is also possible to use supplementary information that can make use of the characteristic feature of each device or control scheme.

57 Claims, 13 Drawing Sheets

| Item | Priority | Size[bit] | Field |
|---|---|---|---|
| Focus-Relative | 1 | 4 | Focusing Mode |
| | | 8 | Focus Position |
| Focus-Absolute | 2 | 4 | Focusing Mode |
| | | 4 | Position Power |
| | | 8 | Position Base |
| Zoom-Relative | 1 | 8 | Focal Length |
| Zoom-Absolute | 2 | 4 | Focal Length Power |
| | | 8 | Focal Length Base |
| Zoom-Normalized | 3 | 4 | Focal Length Power |
| | | 8 | Focal Length Base |
| Pan-1 | 1 | 1 | Direction |
| Pan-2 | 2 | 2 | Speed |
| Pan-3 | 3 | 6 | Speed |

U.S. PATENT DOCUMENTS

| | | | |
|---|---|---|---|
| 7,106,954 B2 * | 9/2006 | Inoue et al. | 386/120 |
| 7,114,660 B1 * | 10/2006 | Cok et al. | 235/494 |
| 7,123,816 B2 * | 10/2006 | McGrath et al. | 386/95 |
| 7,170,632 B1 * | 1/2007 | Kinjo | 358/1.9 |
| 7,225,181 B2 * | 5/2007 | Tsuda | 707/3 |
| 2001/0000970 A1 * | 5/2001 | Ejima | 348/232 |
| 2003/0016942 A1 | 1/2003 | Tojo et al. | 386/46 |
| 2004/0107223 A1 | 6/2004 | Uno et al. | 707/200 |

FOREIGN PATENT DOCUMENTS

| | | |
|---|---|---|
| JP | 6-318373 | 11/1994 |
| JP | 7-303239 | 11/1995 |
| JP | 11-065752 | 3/1999 |

* cited by examiner

FIG. 6

| Item | Priority | Size[bit] | Field |
|---|---|---|---|
| Focus-Relative | 1 | 4 | Focusing Mode |
|  |  | 8 | Focus Position |
| Focus-Absolute | 2 | 4 | Focusing Mode |
|  |  | 4 | Position Power |
|  |  | 8 | Position Base |
| Zoom-Relative | 1 | 8 | Focal Length |
| Zoom-Absolute | 2 | 4 | Focal Length Power |
|  |  | 8 | Focal Length Base |
| Zoom-Normalized | 3 | 4 | Focal Length Power |
|  |  | 8 | Focal Length Base |
| Pan-1 | 1 | 1 | Direction |
| Pan-2 | 2 | 2 | Speed |
| Pan-3 | 3 | 6 | Speed |

FIG. 7

| GROUP | ITEM |
|---|---|
| GROUP1 | Focus-Relative, Zoom-Relative, Zoom-Absolute, Zoom-Normalized, Pan-1, Pan-2 |
| GROUP2 | Focus-Absolute, Pan-3 |

FIG. 8

| GROUP | ITEM |
|---|---|
| GROUP1 | Focus-Relative, Zoom-Relative, Pan-1 |
| GROUP2 | Focus-Absolute, Zoom-Absolute, Zoom-Normalized, Pan-2, Pan-3 |

INFORMATION STORING APPARATUS AND METHOD THEREOF

This application is a continuation of International Application No. PCT/JP02/05229, filed on May 29, 2002, which claims the benefit of priority of Japanese Application No. 2001-165381, filed May 31, 2001, the priorities of which are hereby claimed, said International Application having been published in English as International Publication No. WO 02/098130 A2 on Dec. 5, 2002.

TECHNICAL FIELD

The present invention relates to an information storing apparatus for storing main information and supplementary information corresponding to the main information and a method therefore and, more particularly, to an information storing apparatus suitable for storing a moving image as main information and information representing a state of an image sensing apparatus in a recording medium as supplementary information and a method therefor.

BACKGROUND ART

Techniques of storing supplementary information representing the state of a device at the time of photographing together with photograph data and schemes of encoding/encrypting the supplementary information have been conventionally been proposed in Japanese Patent Laid-Open Nos. 06-318373, 07-303239, and the like. In these proposals, to add and store supplementary information, pieces of supplementary information are put together for each type or the like, and an information structure for adding and storing the supplementary information for each unit is generated.

Consider a case wherein pieces of supplementary information are stored by various devices or schemes. Even for pieces of supplementary information of the same item, generally, various expression forms or encoding/encryption schemes appropriate for the respective devices and control schemes are actually present. However, the above-described supplementary information storing methods can cope with only one expression form or encoding/encryption scheme. In the scheme that allows only one form, supplementary information only needs to cope with that single structure or expression form. However, the characteristic feature of each device or each control scheme is lost.

DISCLOSURE OF INVENTION

The present invention has been made in consideration of the above problem, and has as its object to reliably make it possible to use supplementary information in a form that can be used at least in wide-ranging devices and control schemes and also make it possible to use supplementary information that can make use of the characteristic feature of each device or control scheme.

According to the present invention, the foregoing object is attained by providing an apparatus for storing main information and a supplementary information item that accompanies the main information, comprising: determination means for determining, for each supplementary information item having a plurality of description forms, priority for each of the plurality of description forms in advance; selection means for selecting a description form to be used in recording in accordance with the priority from description forms usable in the apparatus; and recording means for recording the supplementary information item by the selected description form in correspondence with the main information.

According to another aspect of the present invention, the foregoing object is attained by providing a method of storing main information and a supplementary information item that accompanies the main information, comprising: the determination step of determining, for each supplementary information item having a plurality of description forms, priority for each of the plurality of description forms in advance; the selection step of selecting a description form to be used in recording in accordance with the priority from description forms usable in the apparatus; and the recording step of recording the supplementary information item by the selected description form in correspondence with the main information.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 6 is a table showing priority setting for metadata having a plurality of description forms;

FIG. 7 is a table showing an example of metadata item grouping in the embodiment;

FIG. 8 is a table showing an example of metadata item grouping in the embodiment;

BEST MODE FOR CARRYING OUT THE INVENTION

Preferred embodiments of the present invention will now be described in detail in accordance with the accompanying drawings.

In an embodiment to be described below, an example of a moving image sensing apparatus for simultaneously storing information of various sensors or information of user operation as supplementary information together with a moving image will be described.

In this embodiment, in encoding/encrypting supplementary information such as the state of a device at the time of photographing and storing the supplementary information together with image information in a moving image sensing apparatus, the apparatus allows saving and storing the supplementary information by a plurality of expression forms or encoding/encryption schemes. When priority is set for the plurality of expression forms or encoding/encryption schemes, storage of supplementary information using a minimum necessary expression form or encoding/encryption scheme is guaranteed. In addition, supplementary information by an expression form or encoding/encryption scheme that can exhibit its characteristic feature in each device or control scheme can be stored together. Furthermore, in saving and storing the supplementary information, it is made possible to change the storage location and the like in accordance with the supplementary information and to store the supplementary information at a storage location advantageous for each use form or control scheme.

Figure 1:
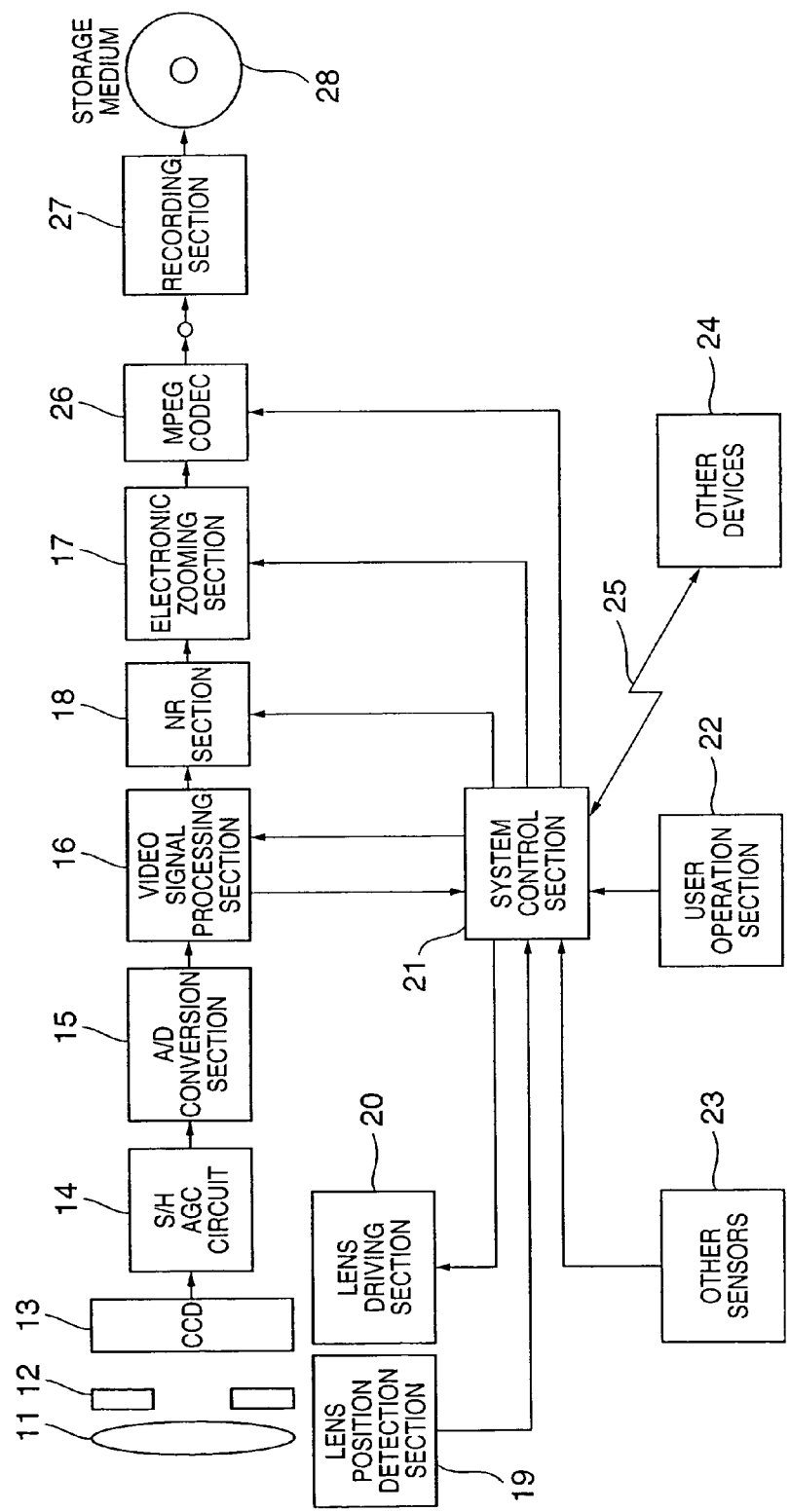
FIG. 1 is a block diagram showing the arrangement of an image sensing apparatus of the embodiment.

FIG. 1 is a block diagram showing the arrangement of an image sensing apparatus of this embodiment. Referring to FIG. 1, a lens section 11 includes a focus lens for adjusting an object distance and a zoom lens for adjusting a focal length, and forms an object image on an image sensing element. A stop 12 adjusts a light amount. An image sensing element 13 is formed from a CCD for converting incident light into an electrical signal. A sample-and-hold/AGC circuit 14 executes sample-and-hold and gain adjustment.

An A/D conversion section 15 executes analog/digital conversion (A/D conversion) for an analog signal from the sample-and-hold/AGC circuit 14. A video signal processing section 16 processes a signal to generate a video signal. A noise reduction section (NR) 18 has a field memory and removes noise from the video signal. An electronic zooming section 17 has a field memory and executes extraction/enlargement and interpolation processing of a video.

Figure 2:
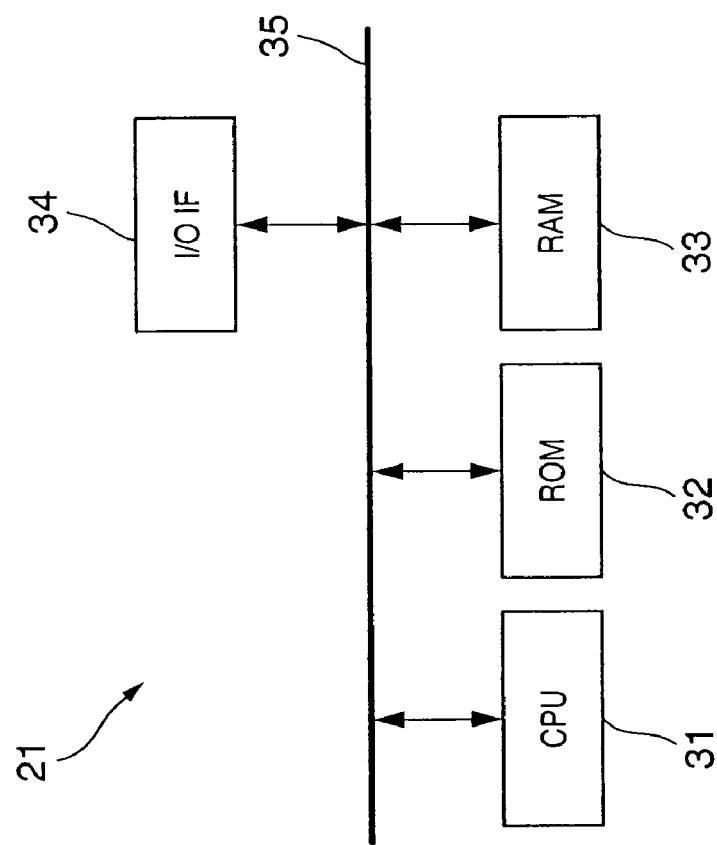
FIG. 2 is a block diagram showing the arrangement of a system control section 21.

A lens position detection section 19 detects the position of the lens. A lens driving section 20 drives the lens. A system control section 21 controls the entire image sensing apparatus. FIG. 2 is a block diagram showing the arrangement of the system control section 21. The system control section 21 has a CPU 31, ROM 32, RAM 33, I/O interface 34, and bus 35. The ROM 32 stores a control program that causes the CPU 31 to implement processing to be described later by flow charts, or various table values (a priority table to be described later in FIG. 6 and group tables to be described later in FIGS. 7 and 8).

Referring back to FIG. 1, a user operation section 22 has a user interface for executing various kinds of control, various kinds of setting, and various kinds of operations of the image sensing apparatus, including initial setting of AEMode (auto-exposure mode) and zooming operation. Other sensors 23 include sensors necessary for determining the state of the image sensing apparatus and sensors, such as a GPS and thermometer, for detecting the ambient state of the image sensing apparatus.

Other devices 24 include accessories of the image sensing apparatus, such as an electronic flash light and interchangeable lens, an external computer (PC) connected through a communication means 25 such as IEEE 1394 or USB, other moving image sensing devices, and devices on a network.

An MPEG-CODEC 26 encodes video data into an MPEG format. A recording section 27 is formed from a drive for recording information in a recording medium 28. The recording medium 28 is, e.g., an optical disk, magnetic disk, magnetooptical disk, magnetic tape, hard disk, non-volatile semiconductor memory (flash memory etc.), or the like.

The operation of the image sensing apparatus of this embodiment with the above arrangement will be described. Light from an object, which is received by the lens section 11, is adjusted in its amount by the stop 12 and forms an image on the surface of the image sensing element 13. The light is converted into an electrical signal by the image sensing element 13, A/D-converted into a digital signal by the A/D conversion section 15 through the sample-and-hold/AGC circuit 14, and input to the video signal processing section 16. In the video signal processing section 16, processing operations such as aperture correction, gamma correction, and white balance correction are executed for the luminance and each color component of the input signal to generate a video signal. The video signal is output to the noise reduction section 18.

The noise reduction section 18 is controlled by a control signal from the system control section 21 to remove noise from the received video signal. The video signal after noise reduction is output to the electronic zooming section 17. The electronic zooming section 17 extracts an image from an image bitmapped on the field memory such that the output video has a magnification based on a control signal from the system control section 21 with respect to the input video, executes enlargement and interpolation processing, and outputs the video to the MPEG-CODEC 26 as frame image data. The MPEG-CODEC 26 encodes the received frame image data. At this time, the MPEG-CODEC 26 generates data such that metadata (to be described later) input from the system control section 21 is stored together with the frame image data, and outputs the data to the recording section 27. In such an image sensing apparatus, the order of application of the noise reduction section 18 and electronic zooming section 17 may be sometimes reversed. That is, the processing result from the video signal processing section 16 may be processed by the electronic zooming section 17, the processing result from the electronic zooming section 17 may be processed by the noise reduction section 18, and the processing result from the noise reduction section 18 may be processed by the MPEG-CODEC 26. Both this scheme and this embodiment are general schemes. Any other arrangement is incorporated in the present invention independently of the processing procedure.

A metadata storing method will be described later. Metadata includes various kinds of supplementary information such as pieces of information which are related to aperture correction, gamma correction, and white balance correction, and are used by the system control section 21 to control the video signal processing section 16, noise reduction section 18, electronic zooming section 17, and lens driving section 20, pieces of information obtained from sensors such as the lens position detection section 19 and other sensors 23, pieces of information (e.g., type of AEMode) which are related to initial setting by the user and are obtained from the user operation section 22, pieces of information which are related to user operation and are obtained from the user operation section 22, and pieces of information obtained from other devices 24 through the communication means 25.

<1. Metadata Storage Processing>

Figure 3:
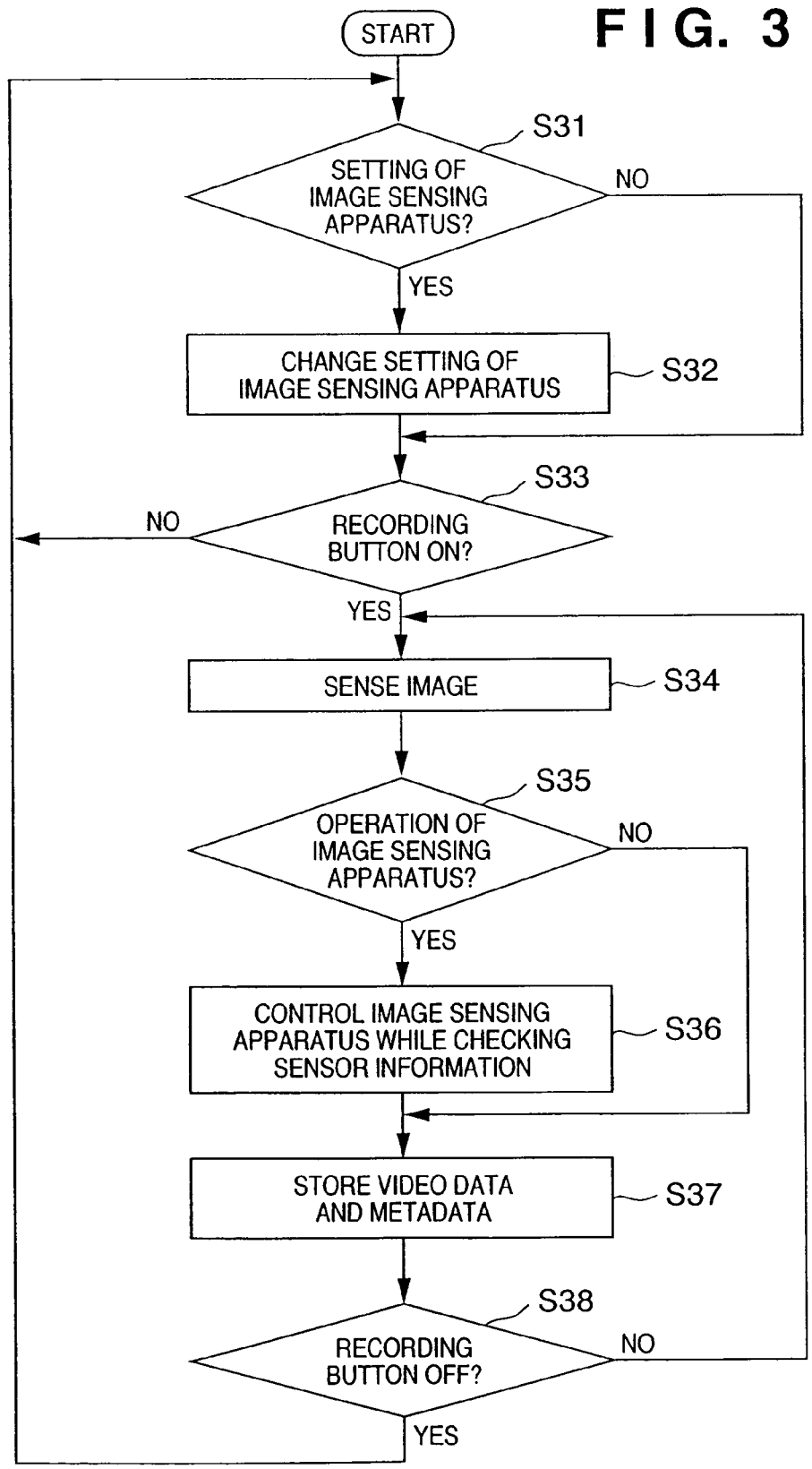
FIG. 3 is a flow chart showing an outline of control by the system control section 21 in recording a moving image and metadata.

FIG. 3 is a flow chart showing an outline of control by the system control section 21 in recording a moving image and metadata. First, in step S31, it is determined whether the user has done setting of the image sensing apparatus through the user operation section 22. Setting of the image sensing apparatus includes, e.g., setting of AEMode. If YES in step S31, setting of the image sensing apparatus is changed, and simultaneously, the setting information is stored in the RAM 33 or the like in step S32. The changed setting information of the image sensing apparatus is sent to the MPEG-CODEC 26 as metadata in step S37 (to be described later). In step S33, it is checked whether the recording button is turned on. If NO in step S33, a standby state is set, and the flow returns to step S31. If YES in step S33, the flow advances to step S34 to set the image sensing apparatus in a recording state, and image sensing is started. The time of start of recording is sent to the MPEG-CODEC 26 as metadata in step S37 (to be described later). In addition, changes in the image sensing apparatus during image sensing, such as a change in focus in an auto-focus mode and a change in environment around the image sensing apparatus, e.g., information of the GPS, are collected by the system control section 21 and sequentially sent to the MPEG-CODEC 26 in step S37 (to be described later).

In step S35, it is checked whether the image sensing apparatus is operated by the user. Operation of the image sensing apparatus includes, e.g., turning on/off the zoom button and panning. If YES in step S35, the flow advances to step S36 to cause the system control section 21 to control the image sensing apparatus by driving the lens driving section 20 and the like on the basis of information from the lens position detection section 19 and other sensors 23. For example, when zooming is instructed, the zoom lens of the lens 11 is moved by the lens driving section 20 through an interval in which the zoom button is kept pressed to zoom. Pieces of sensor information such as the ON/OFF state of the zoom button and the focal distance at that time are collected as metadata and sent to the MPEG-CODEC 26 in subsequent step S37.

Figure 9:
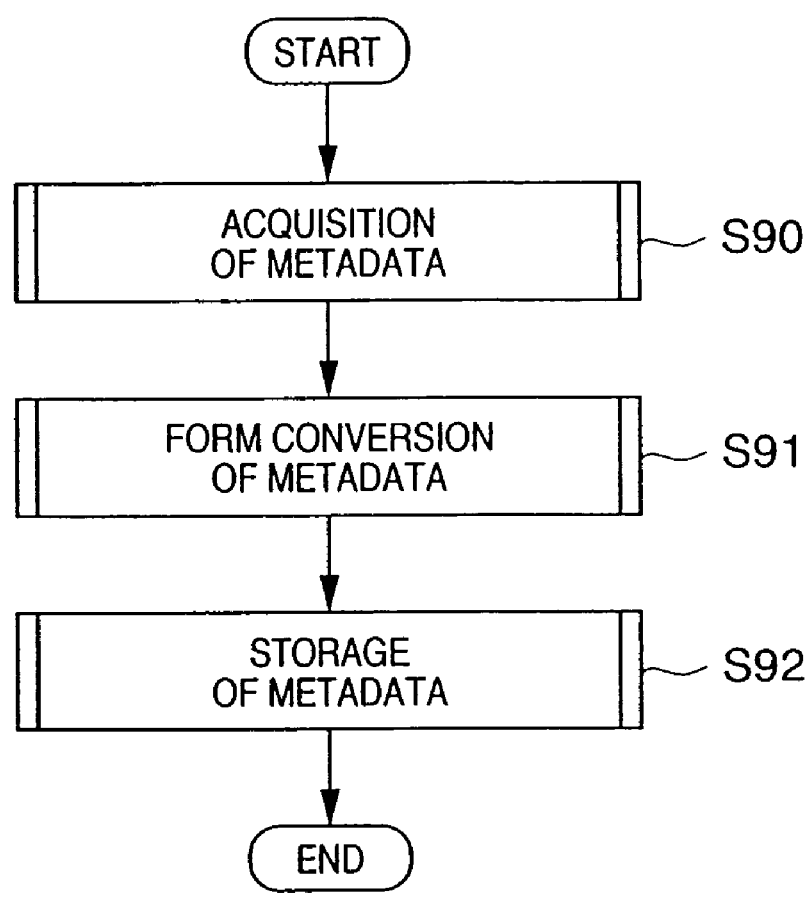
FIG. 9 is a flow chart for explaining an outline of metadata storage processing executed in step S37 of FIG. 3.

In step S37, pieces of information are collected for metadata generation, and metadata is generated and sent to the MPEG-CODEC 26, as will be described later with reference to FIG. 9. The MPEG-CODEC 26 connects video data sent from the electronic zooming section 17 and metadata sent from the system control section 21 by a method (to be described later) (e.g., a method to be described later with reference to FIG. 4) and outputs the data to the recording section 27. The recording section 27 records the data sent from the MPEG-CODEC 26 in the storage medium 28. In step S38, it is checked whether the recording button is turned off. If NO in step S38, the photographing state is kept set. Hence, the flow returns to step S34 to repeat the above-described operation. If YES in step S38, the flow returns to step S31 to set the standby state.

Figure 4:
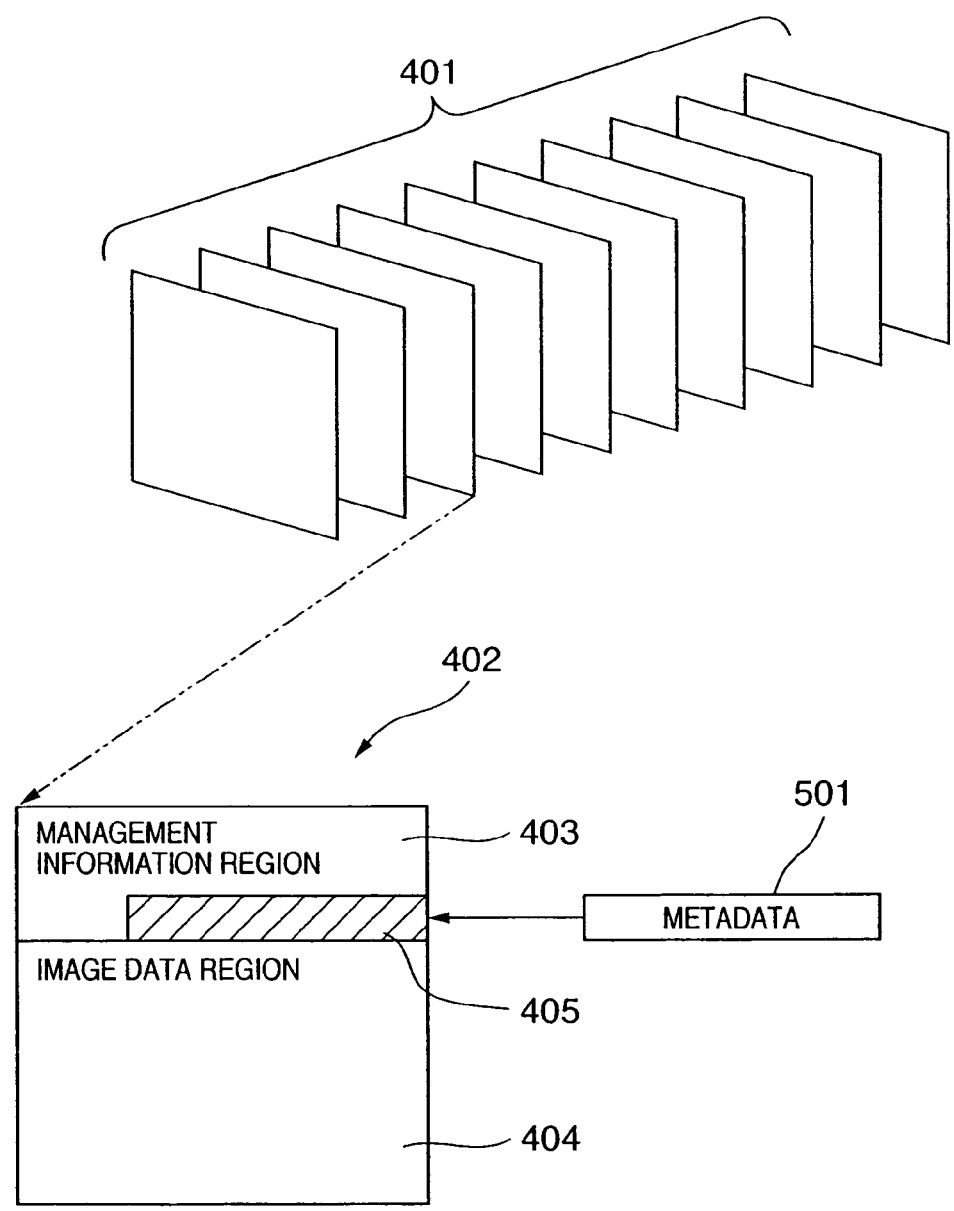
FIG. 4 is a diagram showing a metadata storing method.

FIG. 4 is a diagram showing a metadata storing method. Referring to FIG. 4, reference numeral 401 denotes a frame sequence of a moving image; 402, the data structure of one frame. One frame 402 is formed from a management information region 403 where the size of image data, information related to encoding, the time code of the frame, and the like are stored, and an image data region 404 where the image data itself is stored. A hatched portion in the management information region 403 represents an unused portion. In this embodiment, a metadata storage region 405 is prepared in this unused portion. Reference numeral 501 denotes metadata related to the frame 402. The metadata 501 is stored in the metadata storage region 405. More specifically, for example, an MPEG-2 stream can be stored in the user data region of a picture header or the user data region of GOP (Group of Picture) header.

Figure 5:
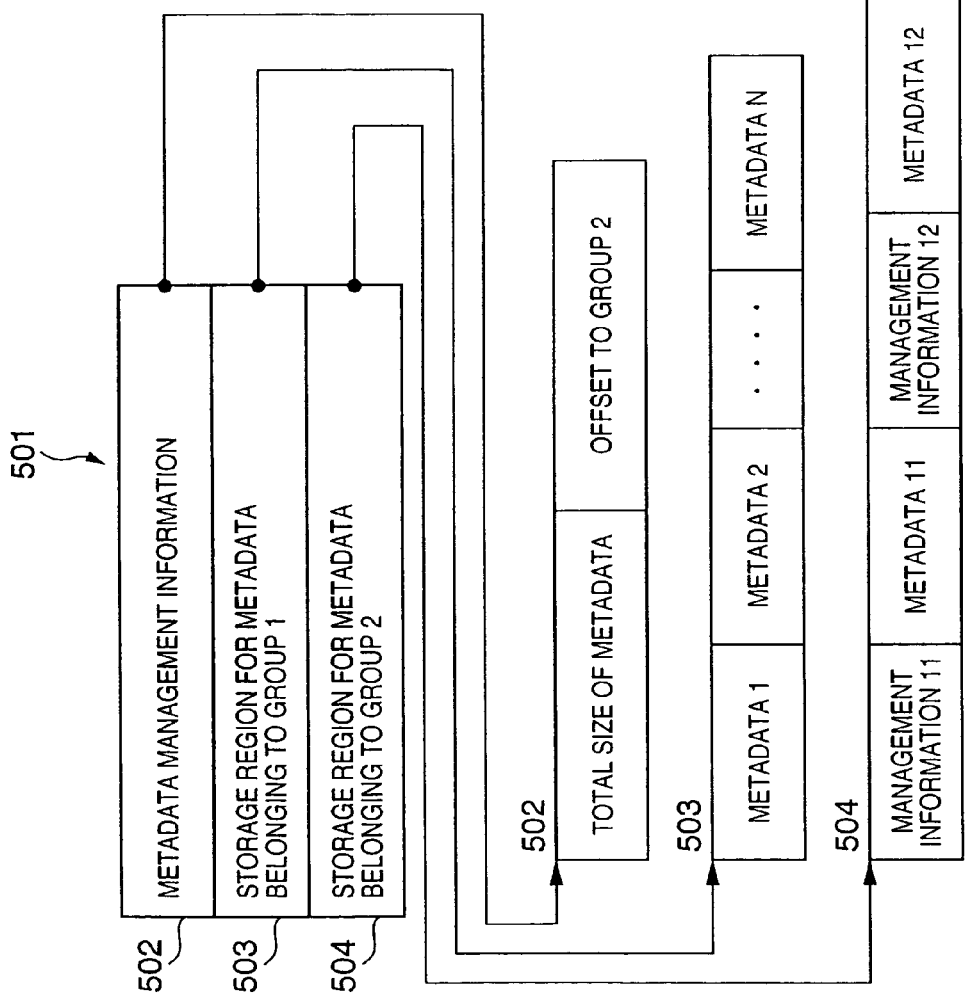
FIG. 5 is a view showing the data structure of metadata.

FIG. 5 is a view showing the data structure of metadata. The metadata 501 contains a plurality of types of data for which easiness of acquisition, use frequency, and the like change depending on a metadata item. Hence, data for which acquisition is easy and the use frequency is high is preferably easy to store and read out. Conversely, information that can be relatively rarely earned or is relatively rarely used is stored to a minimum. The data structure shown in FIG. 5 satisfies this condition.

As shown in FIG. 5, the metadata 501 is formed from metadata management information 502, a storage region 503 for metadata belonging to group 1, and a storage region 504 for metadata belonging to group 2. The metadata management information 502 contains the total size of metadata and the offset to group 2. In the storage region 503 for metadata belonging to group 1, all metadata items classified into group 1 by a method (to be described later) are lined up and recorded in accordance with a predetermined order. In the storage region 504 for metadata belonging to group 2, metadata items classified into group 2 by a method (to be described later) are paired with management information in which pieces of information such as the size and type of metadata are stored, and a necessary number of sets of metadata and management information are lined up and stored. In some cases, expected metadata cannot be acquired due to certain reasons on the device side. In that case, processing of, e.g., storing information representing that no value is present is executed. However, appropriate processing may sometimes change depending on the characteristic of metadata. This point is not particularly specified in the present application.

Since the metadata items in the storage region 503 for metadata belonging to group 1 have a fixed data size and order, they can be read/written on the recording medium at once. On the other hand, for the storage region 504 for metadata belonging to group 2, management information must be generated and written for each metadata item, and individual management information must be decoded and read out for each metadata item. Hence, the structure of the storage region 503 for metadata belonging to group 1 is easier to read/write data than that of the storage region 504 for metadata belonging to group 2.

A metadata description form will be described next. A plurality of description forms may be sometimes present for a single information item. Tables 1 to 3 below show the description forms of metadata "Focus", "Zoom", and "Pan" as examples of metadata having a plurality of description forms.

TABLE 1

Example of Metadata of FOCUS

| | | | |
|---|---|---|---|
| Focus-Relative | Focusing Mode [4bit] | Focusing mode is described by ID. | Automatic = 1 Manual = 2 |
| | Focus Position [8bit] | Focus position is expressed by percentage in focus lens movable range. Focus position corresponding to infinity is 0%. | Percentage |
| Focus-Absolute | Focusing Mode [4bit] | Focusing mode is described by ID. | Automatic = 1 Manual = 2 |
| | Focus Position [12bit] | Focus position is described by object distance. | Position Power [unsigned 4bit] |
| | | Focus position is described by coefficient of following formula: focus position = position base × $10^{position\ power}$ [cm] For infinity, position power = 0, position base = 0 | Position Base [unsigned 8bit] |

TABLE 2

Example of Metadata of ZOOM

| | | | |
|---|---|---|---|
| Zoom-Relative | Focal Length [8bit] | Focal length is expressed by percentage in zoom lens movable range. Lens position corresponding to minimum focal length is 0%. | Percentage |
| Zoom- | Focal | Focal length is described by | Focal Length |

TABLE 2-continued

Example of Metadata of ZOOM

| | | | |
|---|---|---|---|
| Absolute | length [12bit] | focal length. Focal length is described by coefficient of following formula: focal length = focal length base × $10^{focal\ length\ power}$ [mm] | Power [singed 4bit] Focal Length Base [unsigned 8bit] |
| Zoom-Normalized | Focal Length [12bit] | Focal length is described by object distance converted into that for 35-mm film camera. Focal length is described by coefficient of following formula: focal length = focal length base × $10^{focal\ length\ power}$ [mm] | Focal Length Power [signed 4bit] Focal Length Base [unsigned 8bit] |

TABLE 3

Example of Metadata of PAN

| | | | |
|---|---|---|---|
| Pan-1 | Direction [1bit] | | Right = 0 Left = 1 |
| Pan-2 | Speed [2bit] | Speed is expressed at three levels. Step-1 is minimum value, and Step-3 is maximum value. Step-1 < Step-2 < Step-3 | Step-1 (=0) Step-2 (=1) Step-3 (=2) |
| Pan-3 | Speed | Speed is described by coefficient of following formula: Speed = 2 × PS [pixel per field], for, $$1\ pixel\ period = \frac{1}{13.5 \times 10^6}\ [Sec]$$ | PS |

A form such as the unit of a value may sometimes change between sensors. For example, in Table 1, "Focus-Relative" is a description form mainly used when the lens position detection section 19 detects the relative position of the lens section 11 with respect to the focus lens movable range. "Focus-Absolute" is a description form mainly used when a sensor for directly measuring the object distance is mounted.

A value may be able to be converted into another form.

For example, in Table 2, "Zoom-Relative" is a description form mainly used when the lens position detection section 19 detects the relative position of the lens section 11 with respect to the zoom lens movable range. "Zoom-Absolute" is a description form mainly used when the lens position detection section 19 detects the focal length. "Zoom-Normalized" is a form mainly used to describe a value obtained by causing the lens position detection section 19 to detect the focal length and converting the value into that for a 35-mm film camera.

The accuracy of an acquired value may change depending on the sensor performance or value acquisition timing. For example, in Table 3, "Pan-1" is a form used when only the direction of panning is acquired. "Pan-2" is a form used when a rough panning speed is acquired. "Pan-3" is a form used when a precise panning speed is acquired.

Next, the priority is determined for each single metadata. FIG. 6 is a table showing priority setting for metadata having a plurality of description forms. For example, priority 1 shows higher priority than priority 2. Priority is set for each data item (e.g., "focus", "zoom", or "pan"). Various standards can be used to determine priority. For example, priority can be determined in accordance with easiness of information acquisition: high priority is set for a form close to the output form of a widely used sensor, and low priority is set for a form for which a value obtained by a sensor must be converted or low priority is set for a form with high accuracy. Alternatively, high priority may be set for a form with high use frequency.

Next, to determine the metadata storage region, metadata items are divided into groups. Various grouping methods can be used. As the first method, single metadata items are classified in accordance with easiness of information acquisition or use frequency. Metadata items that can easily be acquired or have high use frequency are put into the first group. Metadata items that are relatively hard to acquire or have relatively low use frequency are put into the second group. In the example shown in FIG. 7, "Pan" contains a set of information: "Direction" and "Speed". "Pan-1" and "Pan-2" that have a high use frequency are put into group 1. "Pan-3", i.e., precise "Speed" information is not always necessary and is therefore put into group 2.

Alternatively, metadata items may be grouped in accordance with priority. FIG. 8 shows an example. That is, metadata items with priority 1 are put into group 1, and the remaining metadata items are put into group 2.

A program generated in accordance with the rules of the tables shown in FIGS. 6 to 8 is stored in the ROM 32 or RAM 33 of the system control section 21. Alternatively, these tables are stored in the ROM 32 of the system control section 21, and the system control section 21 executes processing while looking them up.

Metadata storage processing will be described next.

An outline of metadata storage processing executed in step S37 above will be described first with reference to FIG. 9. In step S90, the system control section 21 acquires metadata by, e.g., inquiring various kinds of sensors about it. In step S91, if there is metadata whose form can be converted using a conversion formula, that form is converted. However, this processing (conversion processing) need not always be executed. This processing may be skipped. In step S92, the metadata is sent to the MPEG-CODEC 26 whereby the metadata is stored in the storage medium 28 together with image data. Each of the processing operations in steps S90 to S92 will be described below in detail.

Figure 10:
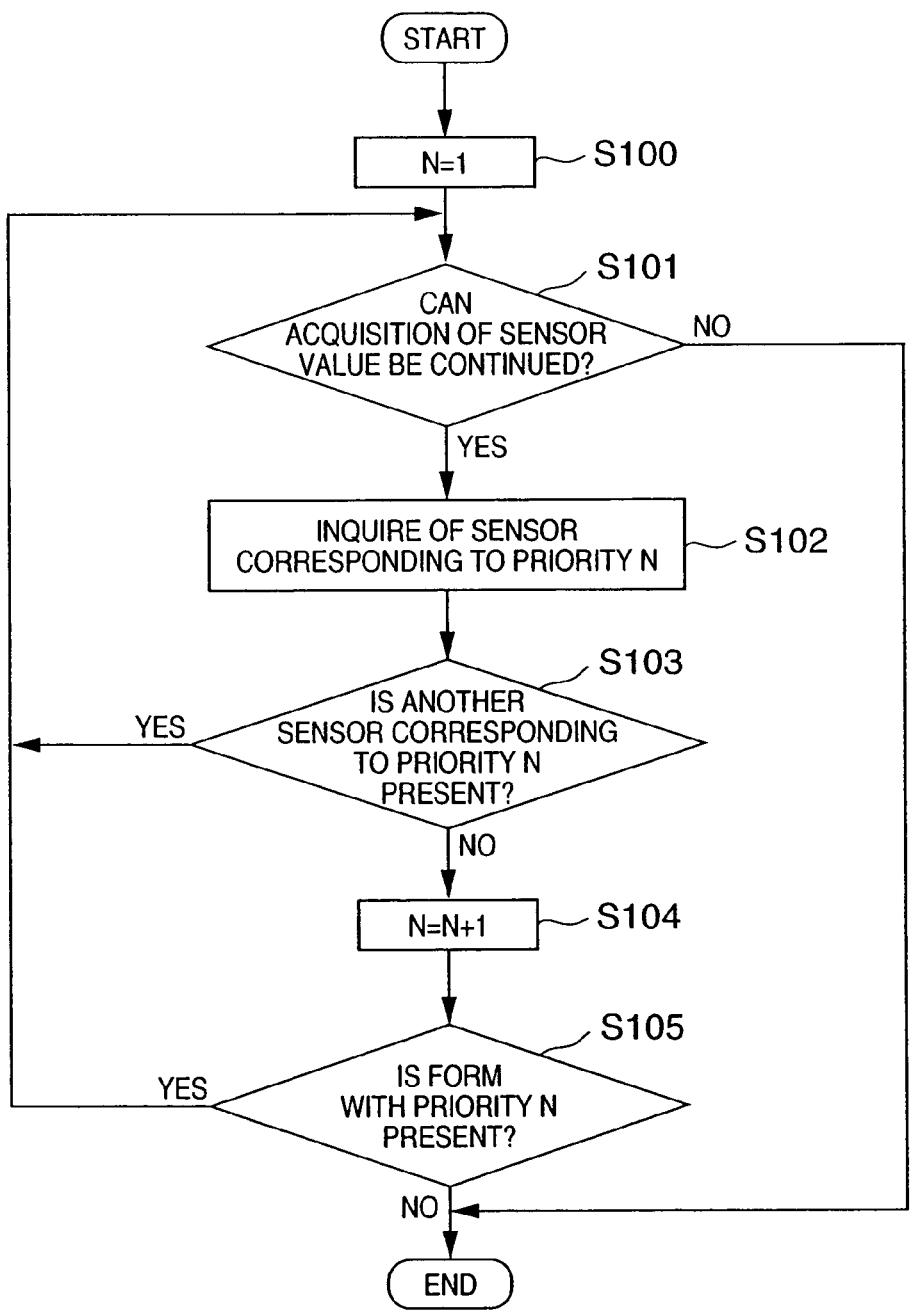
FIG. 10 is a flow chart for explaining metadata acquisition processing in step S90 of FIG. 9.

The metadata acquisition processing in step S90 will be described in detail with reference to FIG. 10. In step S100, 1 is set in N. In step S101, it is determined whether the system control section 21 can continue acquisition of a sensor value. For example, the following two limitation conditions are used as determination conditions. That is, (1) Is there still time to acquire?
(2) Does the memory for temporarily holding data have enough capacity?

Limitation condition (1) will be described. To store metadata data for each frame in real time in photographing a moving image, the time from acquisition to storage of metadata is limited. For NTSC, since the frame rate is about 30 frames/sec, the processing time must be shorter than about ⅟30 sec. Limitation (2) corresponds to a case wherein the capacity of the memory for holding metadata at once is limited.

In this embodiment, when limitation conditions (1) and (2) above are satisfied, it is determined that the value of another sensor can be acquired, and the flow advances to step S102. In step S102, the system control section 21 inquires of a sensor corresponding to the form with priority N to acquire information.

In step S103, it is determined whether another sensor corresponding priority N is present. If YES in step S103, processing in steps S101 and S102 is repeated. If NO in step S103, the flow advances to step S104 to increment N to acquire information from sensors for the next priority. In step S105, it is determined whether a metadata item having a form with priority N is present. If YES in step S105, processing in steps S101 to S104 is repeated.

If it is determined in step S101 that one of limitation conditions (1) and (2) is not satisfied, or it is determined in step S105 that no metadata item having a form with priority N is present, the processing is ended. For the descriptive convenience, only metadata obtained from a sensor has been described here. However, the processing also applies to a case wherein metadata is obtained from the user operation section 22 or other devices 24.

With the above processing, even when limitation conditions are present, pieces of information are acquired preferentially from metadata items with higher priority.

Figure 11:
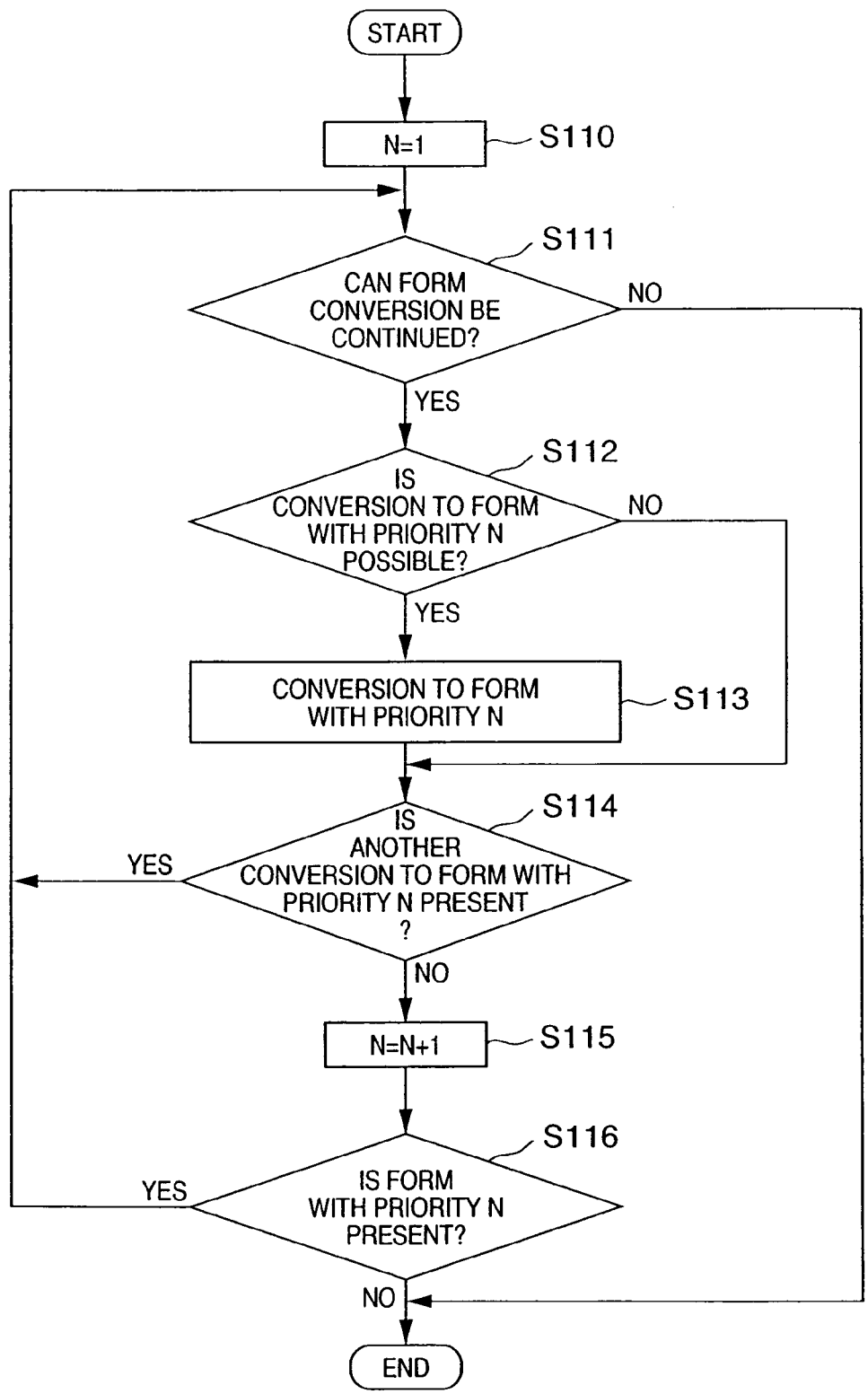
FIG. 11 is a flow chart for explaining metadata description form conversion processing in step S91 of FIG. 9.

The metadata description form conversion processing in step S91 will be described next in detail with reference to FIG. 11. In this processing, the description form of the data (the output value from the sensor) acquired by the above metadata acquisition processing is converted. First, in step S110, 1 is set in N. In step S111, it is determined whether conversion of the data form (description form) can be continued. As determination conditions, the following two limitation conditions can be used, as in, e.g., metadata acquisition processing in step S90 (step S101):

(1) Is there still time to convert?
(2) Does the memory for temporarily holding data have enough capacity?

Other conditions may, of course, be used.

When limitation conditions (1) and (2) are satisfied, the flow advances to step S112. In step S112, it is determined whether the current metadata of interest is a metadata item that can be converted into a form with priority N. Examples of determination conditions at this time are (3) Does the system control section 21 have an arithmetic capability necessary for conversion?
(4) Has the value of a format as the base of conversion been set?

Condition (3) corresponds to a case wherein the CPU 31 of the system control section 21 has a limited arithmetic capability. Condition (4) corresponds to a case wherein no value is set in some cases because the sensor cannot detect information depending on the timing of inquiry.

In this embodiment, when limitation conditions (3) and (4) are satisfied, it is determined that conversion to a form with priority N is possible, and the flow advances to step S113. If the conditions are not satisfied, step S113 is skipped, and the flow advances to step S114. In step S113, the data is converted into a form (description form) with priority N. In step S114, it is determined whether another metadata item that can be converted into the description form with priority N has been acquired. If YES in step S114, processing in steps S111 to S113 is repeated. If NO in step S114, the flow advances to step S115 to increment N.

In step S116, it is determined whether a metadata item having the form with priority N is present. If YES in step S116, processing in steps S111 to S115 is repeated. If limitation conditions (1) and (2) are not satisfied in step S111, or no metadata item having the form with priority N is present in step S116, the processing is ended. For the descriptive convenience, only metadata obtained from a sensor has been described here. However, the processing also applies to a case wherein metadata is obtained from the user operation section 22 or other devices 24.

With the above processing, even when limitation conditions are present, the forms are converted preferentially from metadata items with higher priority.

Figure 12:
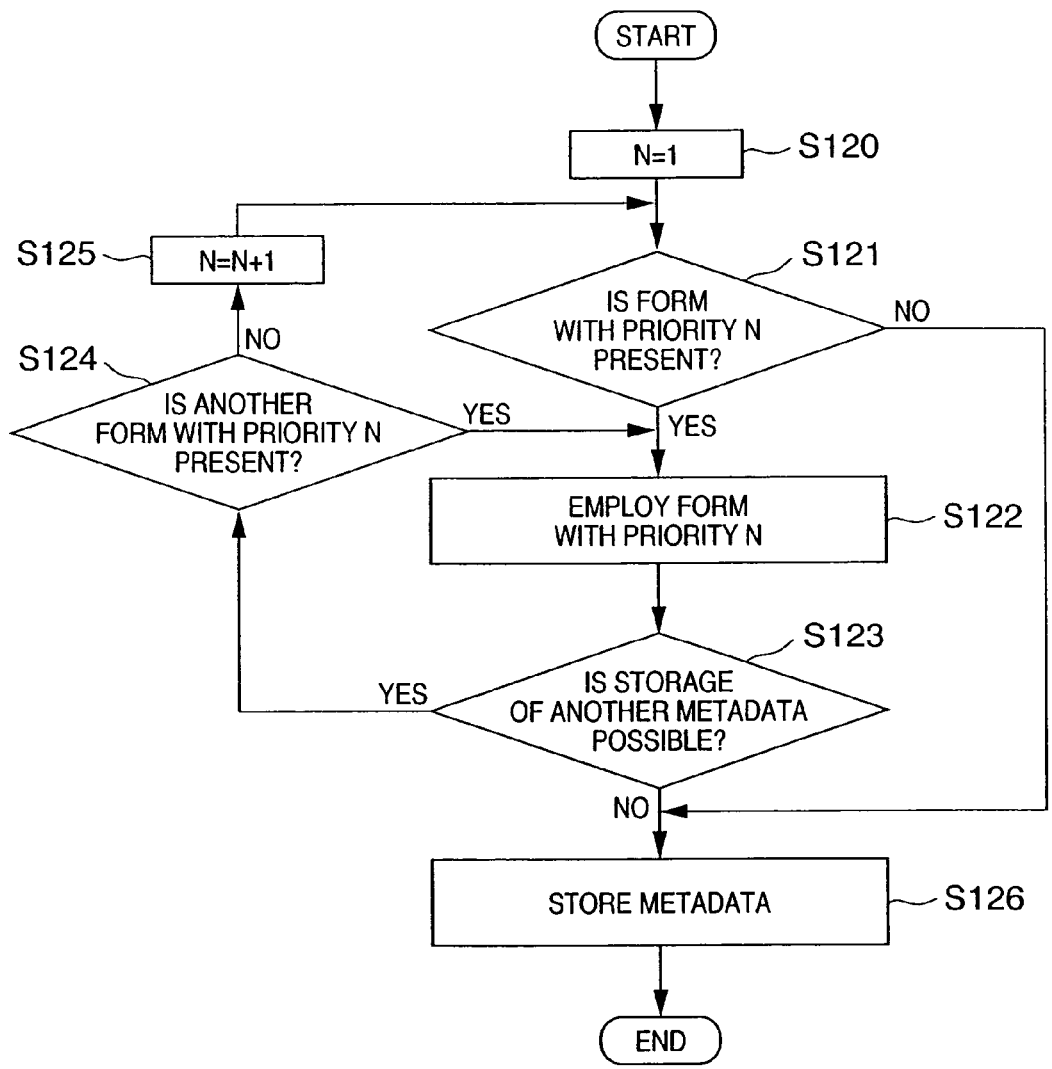
FIG. 12 is a flow chart for explaining metadata storage processing in step S92 of FIG. 9.

The metadata storage processing in step S92 will be described next in detail with reference to FIG. 12. In step S120, 1 is set in N. In step S121, it is determined whether a metadata item having the description form with priority N is present as a result of the metadata acquisition processing in step S90 and a result of the metadata conversion processing in step S91. If YES in step S121, the flow advances to step S122 to decide to employ the metadata item by the description form.

In step S123, it is determined whether another metadata can be stored. Examples of determination conditions are (5) Is there still time necessary for storing metadata with respect to the time necessary for recording, which has been acquired in advance from the MPEG-CODEC 26 or the like?
(6) Does the amount of metadata that can be stored at once have a margin with respect to the recordable metadata amount which has been acquired in advance from the MPEG-CODEC 26or the like?

Limitation (5) corresponds to a case wherein a predetermined time is required to store data in the storage medium. Limitation (6) corresponds to a case wherein the amount of metadata that can be stored at once is limited. The process of acquiring metadata (step S90) may be configured so that values from sensors may not be acquired when it is judged that the amount of metadata exceeds the limitation.

In this embodiment, when limitation conditions (5) and (6) are satisfied, it is determined that another metadata can be stored, and the flow advances to step S124. In step S124, it is determined whether a metadata item having the form with priority N, which should be employed as metadata, remains as a result of the metadata acquisition processing in step S90 and a result of the metadata conversion processing in step S91. If YES in step S124, processing in steps S122 and S123 is repeated. If NO in step S124, N is incremented in step S125, and processing in steps S121 to S124 is repeated.

If NO in step S121 or limitation conditions (5) and (6) are not satisfied in step S123, the flow advances to step S126. In step S126, the data item that is determined in step S122 to be employed as metadata is sent from the system control section 21 to the MPEG-CODEC 26. The MPEG-CODEC 26 loads the metadata received from the system control section 21 to the management information region 403 in accordance with the form shown in FIG. 5 in accordance with the grouping set as shown in FIG. 7 or 8, and outputs the data to the recording section 27. The recording section 27 records the data received from the MPEG-CODEC 26 on the storage medium 28.

With the above processing, even when limitation conditions are present, data are stored preferentially from metadata items with higher priority.

<2. Metadata Utilization Processing>

Figure 13:
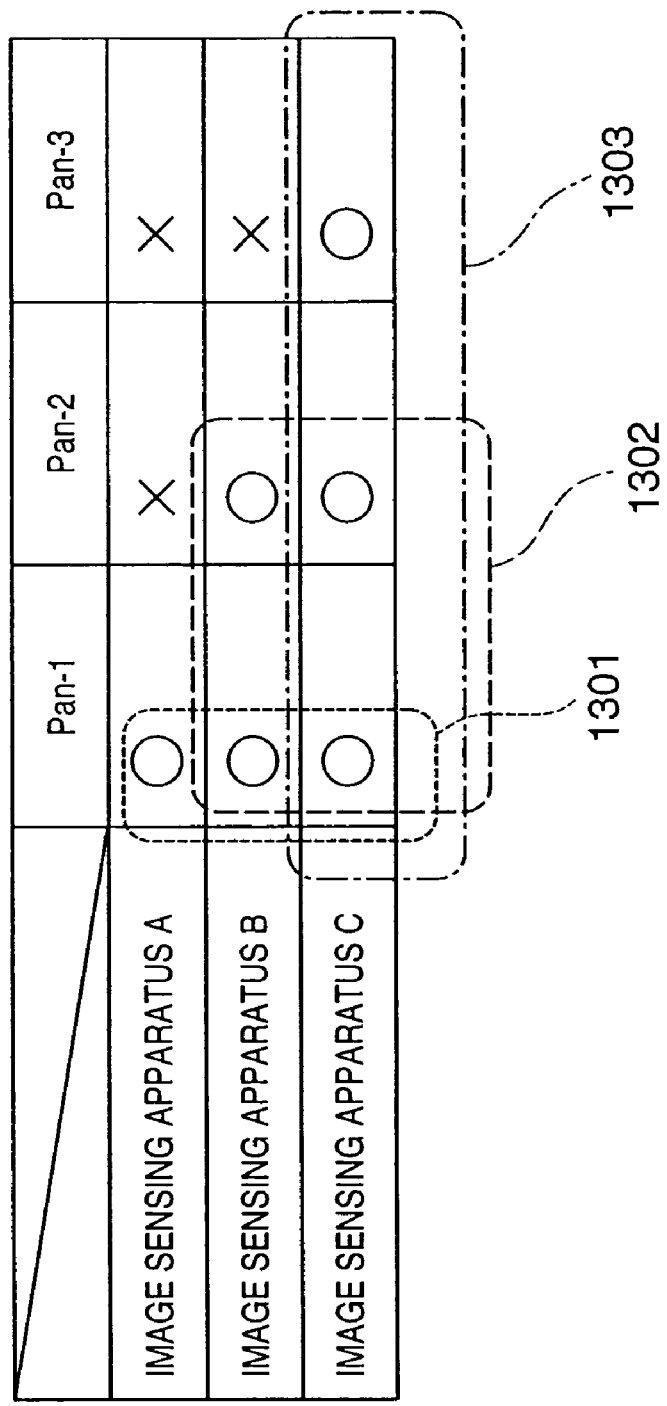
FIG. 13 is a table for explaining correspondence of metadata formats in a plurality of image sensing apparatuses.

Utilization of metadata that are stored in the above-described way will be described next. For the descriptive convenience, assume that three image sensing apparatuses (A to C) shown in FIG. 13 are present. Additionally, as a metadata item, "Pan" will be exemplified. Assume that the three image sensing apparatuses (A to C) store metadata in accordance with rule of the table shown in FIG. 6. As shown in FIG. 13, for "Pan", the image sensing apparatus A can store only the description form of "Pan-1" with priority 1. For "Pan", the image sensing apparatus B can store description forms up to priority 2, i.e., the forms of "Pan-1" and "Pan-2". For "Pan", the image sensing apparatus C can store description forms up to priority 3, i.e., the description forms of "Pan-1", "Pan-2", and "Pan-3".

When frames are to be classified in accordance with "Pan" information and output in an apparatus capable of using the data of each image sensing apparatus, the following operation is executed. To classify all data of the image sensing apparatuses A to C, it is done using the description form of "Pan-1" with priority 1 (1301 in FIG. 13). With this processing, a classification result by the direction of "Pan" is output. Hence, the user can always obtain the classification result in the form with priority 1 for all data of the image sensing apparatuses A to C. In this way, it becomes possible to collectively process data of a plurality of different image sensing apparatuses by a single video editing apparatus or the like.

To classify all data of the image sensing apparatuses B and C, it is done using the description form of "Pan-1" with priority 1 and the description form of "Pan-2" with priority 2 (1302 in FIG. 13). With this processing, a classification result by the direction of "Pan" and a coarse classification result by the speed of "Pan" are output.

To classify data of only the image sensing apparatus C, all forms can be handled (1303 in FIG. 13). Hence, classification is done using the description form of "Pan-1" with priority 1 and the description form of "Pan-3" with priority 3. As a consequence, a classification result by the direction of "Pan" and a detailed classification result by the speed of "Pan" are output.

As describe above, the user can always obtain a classification result by the most accurate form in accordance with the capability of each image sensing apparatus.

In the above embodiment, all metadata pass through the system control section 21. However, the present invention is not limited to this.

In the above embodiment, metadata is received by the MPEG-CODEC 26 and loaded into the management information region of image frame data. However, the present invention is not limited to this. For example, metadata may be received by the recording section 27, and after recording of video data, the metadata may be recorded together with information representing the relationship to the frame.

In the above embodiment, metadata is stored for each frame. However, this is merely an example. For example, metadata may be stored in the footer region of a moving image file together with information representing the relationship to the frame in video data.

In the above embodiment, metadata belonging to each group are stored using the form shown in FIG. 5. However, metadata may be divisionally stored at a location that is relatively easy to access or at a location that is relatively hard to access. For example, when metadata are to be stored in the footer region of the moving image file and recorded on the storage medium, the metadata may be stored for each group in the footer region, and only metadata belonging to group 1 may be stored in the inner peripheral portion of the disk.

In the above embodiment, metadata are classified into two groups. However, the metadata may be classified into three or more groups in accordance with the easiness of storage and use frequency or the characteristic of a storage region.

As described above, according to the embodiment, since a metadata item having a description form with high priority is preferentially stored independently of the moving image sensing apparatus that has sensed the data, search or classification based on the form with high priority can be reliably done.

Also, when search or classification apparatus is made, it is possible to perform search or classification having higher accuracy or stronger function, by enabling to utilize metadata item whose description form has low priority but high accuracy. It is needless to say that, even in the above case, metadata whose description form has high priority can be used for performing search or classification.

In addition, only by generating a search or classification apparatus coping with a single data structure, data that are stored using even a form with low priority can be searched for or classified using the form for which low priority is set.

The object of the present invention can also be achieved by supplying a storage medium which stores software program codes for implementing the functions of the above-described embodiment to a system or apparatus and causing the computer (or a CPU or MPU) of the system or apparatus to read out and execute the program codes stored in the storage medium.

In this case, the program codes read out from the storage medium implement the function of the above-described embodiment by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The function of the above-described embodiment is implemented not only when the readout program codes are executed by the computer but also when the operating system (OS) running on the computer performs part or all of actual processing on the basis of the instructions of the program codes.

The function of the above-described embodiment is also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

EFFECT OF INVENTION

As has been described above, according to the present invention, it is reliably possible to use supplementary information in a form that can be used at least in wide-ranging devices and control schemes, and it is also possible to use supplementary information that can make use of the characteristic feature of each device or control scheme.

As many apparently widely different embodiments of the present invention can be made without departing from the spirit and scope thereof, it is to be understood that the invention is not limited to the specific embodiments thereof except as defined in the appended claims.

The invention claimed is:

1. An apparatus for storing main information and at least one supplementary information item that accompanies the main information and that conveys information about a respective parameter, comprising:
    a recording unit configured to record the supplementary information item, said recording unit being able to record the supplementary information item in any of at least two description forms, the at least two description forms conveying information about the same parameter;
    a determination unit configured to determine, for each supplementary information item having a plurality of description forms, priority for each of the plurality of description forms in advance; and
    a selection unit configured to select a description form to be used in recording in accordance with the priority from description forms usable in the apparatus, and the recording unit recording the supplementary information item by the selected description form in correspondence with the main information.

2. The apparatus according to claim 1, wherein said selection unit selects a plurality of description forms to be used from the description forms usable in the apparatus in descending order of priority within a usable range in consideration of a limitation of the apparatus.

3. The apparatus according to claim 1, wherein said selection unit selects a plurality of description forms or expression forms to be used from the description forms usable in the apparatus in descending order of priority within a usable range in consideration of a limitation of the apparatus and simultaneously selects all description forms having priority higher than the lowest priority in the selected description forms.

4. The apparatus according to claim 1, wherein when the description forms usable in the apparatus include description forms that cannot be simultaneously used because of a limitation of the apparatus, said selection unit selects one description form having high priority for the description forms, and for the remaining description forms, selects the plurality of usable description forms to be used in descending order of priority.

5. The apparatus according to claim 1, wherein when the description forms usable in the apparatus include usable description forms whose number or combination is limited because of a limitation of the apparatus, said selection unit selects description forms having high priority as many as possible within the limit.

6. The apparatus according to claim 1, wherein said selection unit selects a description form to be used from the description forms usable in the apparatus in descending order of priority within a usable range in consideration of a limitation of the apparatus and changes a storage location or storage scheme of the supplementary information item on a storage medium in accordance with the priority.

7. The apparatus according to claim 6, wherein, in changing the storage location or storage scheme of the supplementary information item on the storage medium, said selection unit stores a supplementary information item with a description form having high priority at a storage location or by a storage scheme, with which storage or retrieval is easy.

8. The apparatus according to claim 6, wherein, in changing the storage location or storage scheme of the supplementary information item on the storage medium, said selection unit stores supplementary information at a storage location or by a storage scheme, with which storage or retrieval of the supplementary information item is easy, in an order of priority of the description form or expression form.

9. The apparatus according to claim 6, wherein, in changing the storage location or storage scheme of the supplementary information item on the storage medium, said selection unit defines in advance a rule to assign a description form having specific priority to each of a plurality of storage locations or storage schemes on the storage medium and determines the storage location or storage scheme in accordance with the rule.

10. The apparatus according to claim 6, wherein, in changing the storage location or storage scheme of the supplementary information item on the storage medium, said selection unit defines in advance a rule to assign a description form having specific priority to each of a plurality of storage locations or storage schemes on the storage medium for each supplementary information item to be recorded and determines the storage location or storage scheme in accordance with the rule.

11. The apparatus according to claim 1, wherein
the apparatus is a moving image sensing apparatus, and
the main information is a moving image, and the supplementary information item contains at least one of information of an image sensing device, state information of an optical device, information related to a user's operation, and information related to a photographing environment at the time of photographing.

12. The apparatus according to claim 11, wherein when a plurality of sensors or devices related to the supplementary information item are present, the sensor or device whose information is to be selected and stored is determined in descending order of priority.

13. The apparatus according to claim 11, wherein when acquisition of information from a sensor or another device has a limitation, the sensor or another device whose information is to be selected and stored is determined in descending order of priority.

14. The apparatus according to claim 13, wherein the limitation is a limitation related to a time in which the information is acquired from the sensor or another device.

15. The apparatus according to claim 13, wherein the limitation is a limitation related to a temporary storage amount of the information acquired from the sensor or another device.

16. The apparatus according to claim 11, wherein when arithmetic operation of simultaneously converting information from a sensor or device into a plurality of unit systems or accuracies has a limitation, the unit system to be selected is determined in descending order of priority.

17. The apparatus according to claim 16, wherein the limitation is a limitation related to a time in which the information from the sensor or device is simultaneously re-calculated to the plurality of unit systems or accuracies.

18. The apparatus according to claim 16, wherein the limitation is a limitation related to a temporary storage amount of the re-calculated information.

19. The apparatus according to claim 16, wherein the limitation is a limitation related to an arithmetic capability for simultaneously re-calculating the information from the sensor or another device to the plurality of unit systems or accuracies.

20. The apparatus according to claim 16, wherein the limitation is that the information from the sensor of another device contains unacquired information.

21. The apparatus according to claim 11, wherein when information from a sensor or another device can be simultaneously described by a plurality of forms, and a limitation related to the description is present, the sensor or another device whose information is to be selected and stored is determined in descending order of priority.

22. The apparatus according to claim 21, wherein the limitation is a limitation related to a time usable for the description.

23. The apparatus according to claim 21, wherein the limitation is a limitation related to an amount of information that can be described.

24. The apparatus according to claim 11, wherein the priority is defined in accordance with easiness of information acquisition or use frequency of information.

25. The apparatus according to claim 11, wherein when information from a sensor or another device can be simultaneously described by a plurality of forms, each body of information is described while dividing a storage region for the priority that is defined in advance for each form of information.

26. The apparatus according to claim 11, wherein when information from a sensor or another device can be simultaneously described by a plurality of forms, each body of information is selectively described in accordance with a storage region that is defined in advance for each form of information.

27. The apparatus according to claim 26, wherein the storage region of each body of information is defined in accordance with easiness of information acquisition or use frequency of information.

28. The apparatus according to claim 1, wherein the supplementary information item corresponds to one or another of plural types of device status, and the plurality of description forms correspond respectively to a plurality of descriptions describing one type of device status in a plurality of different ways.

29. A method of storing main information and at least one supplementary information item that accompanies the main information and that conveys information about a respective parameter, comprising:
   a recording step of recording the supplementary information item, said recording step being performable to record the supplementary information item in any of at least two description forms, the at least two description forms conveying information about the same parameter;
   a determination step of determining, for each supplementary information item having a plurality of description forms, priority for each of the plurality of description forms in advance; and
   a selection step of selecting a description form to be used in recording in accordance with the priority from description forms usable in a given apparatus, and
   said recording step including recording the supplementary information item by the selected description form in correspondence with the main information.

30. The method according to claim 29, wherein, in the selection step, a plurality of description forms to be used are selected from the description forms usable in the apparatus in descending order of priority within a usable range in consideration of a limitation of the apparatus.

31. he method according to claim 29, wherein, in the selection step, a plurality of description forms or expression forms to be used are selected from the description forms usable in the apparatus in descending order of priority within a usable range in consideration of a limitation of the apparatus, and simultaneously, all description forms having priority higher than the lowest priority in the selected description forms are selected.

32. The method according to claim 29, wherein, in the selection step, when the description forms usable in the apparatus include description forms that cannot be simultaneously used because of a limitation of the apparatus, one description form having high priority is selected for the description forms, and for the remaining description forms, the plurality of usable description forms to be used are selected in descending order of priority.

33. The method according to claim 29, wherein, in the selection step, when the description forms usable in the apparatus include usable description forms whose number or combination is limited because of a limitation of the apparatus, description forms having high priority are selected as many as possible within the limit.

34. The method according to claim 29, wherein, in the selection step, a description form to be used is selected from the description forms usable in the apparatus in descending order of priority within a usable range in consideration of a limitation of the apparatus, and a storage location or storage scheme of the supplementary information item on a storage medium is changed in accordance with the priority.

35. The method according to claim 34, wherein, in the selection step, in changing the storage location or storage scheme of the supplementary information item on the storage medium, a supplementary information item with a description form having high priority is stored at a storage location or by a storage scheme, with which storage or retrieval is easy.

36. The method according to claim 34, wherein, in the selection step, in changing the storage location or storage scheme of the supplementary information item on the storage medium, supplementary information is stored at a storage location or by a storage scheme, with which storage or retrieval of the supplementary information item is easy, in an order of priority of the description form or expression form.

37. The method according to claim 34, wherein, in the selection step, in changing the storage location or storage scheme of the supplementary information item on the storage medium, a rule to assign a description form having specific priority to each of a plurality of storage locations or storage schemes on the storage medium is defined in advance, and the storage location or storage scheme is determined in accordance with the rule.

38. The method according to claim 34, wherein, in the selection step, in changing the storage location or storage scheme of the supplementary information item on the storage medium, a rule to assign a description form having specific priority to each of a plurality of storage locations or storage schemes on the storage medium for each supplementary information item to be recorded is defined in advance, and the storage location or storage scheme is determined in accordance with the rule.

39. The method according to claim 29, wherein
   the apparatus is a moving image sensing apparatus, and
   the main information is a moving image, and the supplementary information item contains at least one of information of an image sensing device, state information of an optical device, information related to a user's operation, and information related to a photographing environment at the time of photographing.

40. The method according to claim 39, wherein when a plurality of sensors or devices related to the supplementary information item are present, the sensor or device whose information is to be selected and stored is determined in descending order of priority.

41. The method according to claim 39, wherein when acquisition of information from a sensor or another device has a limitation, the sensor or another device whose information is to be selected and stored is determined in descending order of priority.

42. The method according to claim 41, wherein the limitation is a limitation related to a time in which the information is acquired from the sensor or another device.

43. The method according to claim 41, wherein the limitation is a limitation related to a temporary storage amount of the information acquired from the sensor or another device.

44. The method according to claim 39, wherein when arithmetic operation of simultaneously converting information from a sensor or device into a plurality of unit systems or accuracies has a limitation, the unit system to be selected is determined in descending order of priority.

45. The method according to claim 44, wherein the limitation is a limitation related to a time in which the information from the sensor or device is simultaneously re-calculated to the plurality of unit systems or accuracies.

46. The method according to claim 44, wherein the limitation is a limitation related to a temporary storage amount of the re-calculated information.

47. The method according to claim 44, wherein the limitation is a limitation related to an arithmetic capability for simultaneously re-calculating the information from the sensor or another device to the plurality of unit systems or accuracies.

48. The method according to claim 44, wherein the limitation is that the information from the sensor of another device contains unacquired information.

49. The method according to claim 39, wherein when information from a sensor or another device can be simultaneously described by a plurality of forms, and a limitation related to the description is present, the sensor or another device whose information is to be selected and stored is determined in descending order of priority.

50. The method according to claim 49, wherein the limitation is a limitation related to a time usable for the description.

51. The method according to claim 49, wherein the limitation is a limitation related to an amount of information that can be described.

52. The method according to claim 39, wherein the priority is defined in accordance with easiness of information acquisition or use frequency of information.

53. The method according to claim 39, wherein when information from a sensor or another device can be simultaneously described by a plurality of forms, each body of information is described while dividing a storage region for the priority that is defined in advance for each form of information.

54. The method according to claim 39, wherein when information from a sensor or another device can be simultaneously described by a plurality of forms, each body of information is selectively described in accordance with a storage region that is defined in advance for each form of information.

55. The method according to claim 54, wherein the storage region of each body of information is defined in accordance with easiness of information acquisition or use frequency of information.

56. A computer-readable medium which stores a control program for causing a computer to execute the information storing method of claim 29.

57. The method according to claim 29, wherein the supplementary information item corresponds to one or another of plural types of device status, and the plurality of description forms correspond respectively to a plurality of descriptions describing one type of device status in a plurality of different ways.

* * * * *